Feb. 7, 1939.   W. E. GREENE   2,146,139
DIESEL ENGINE FUEL SYSTEM
Filed Feb. 20, 1937   3 Sheets-Sheet 2

Inventor.
W. E. Greene
By Lester R. Sargent
Attorney

Feb. 7, 1939.  W. E. GREENE  2,146,139
DIESEL ENGINE FUEL SYSTEM
Filed Feb. 20, 1937  3 Sheets-Sheet 3
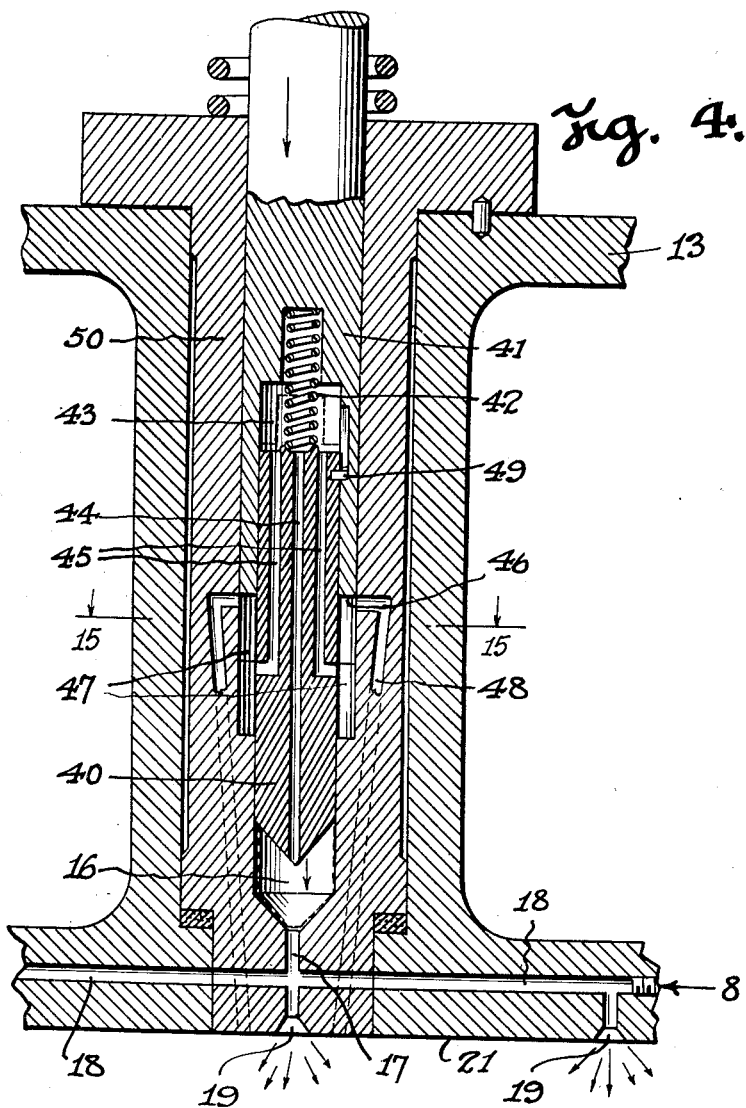
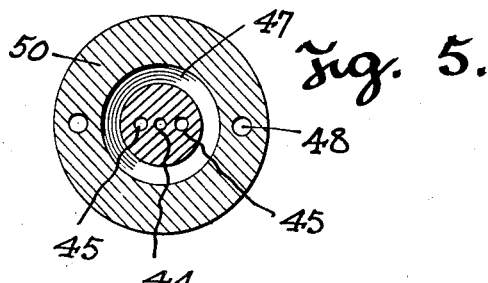
Inventor.
W. E. Greene
By Lester L. Sargent.
Attorney Patented Feb. 7, 1939

2,146,139

UNITED STATES PATENT OFFICE 2,146,139

DIESEL ENGINE FUEL SYSTEM

Whitney Eastman Greene, El Paso, Tex.

Application February 20, 1937, Serial No. 126,929

2 Claims. (Cl. 123—33)

The objects of my invention are:

First, to deliver and distribute the fuel supply from a single fuel pump to the various cylinders of a multi-cylinder engine in such a manner that each cylinder will receive a uniformly equal supply of fuel at exactly regulated intervals, with accurate control of this distribution for varying speeds and loads;

Second, to prepare the fuel before entering each cylinder so that each particle is made more ready for combustion than by any other method, and in such complete distribution throughout the air in the combustion chamber so that a greater thermal efficiency will be obtained;

Third, to make it possible to deliver the fuel to each cylinder in such a manner that very little pressure in the fuel delivery system is required, thereby making possible higher speed engines at lower costs;

Fourth, to make possible a cooler running engine, with a minimum of so-called "after-burning", and a uniform and complete combustion;

Fifth, to provide a novel combination and arrangement of parts in the several forms of the invention disclosed in the accompanying drawings and hereinafter described.

I attain these and other objects of my invention by the mechanism illustrated in the accompanying drawings, in which—

Fig. 4 is a vertical section of a modified form of combined pump and injection nozzle which I have devised;

Fig. 5 is a horizontal section on line 4—4 of Fig. 4, and;

Like characters of reference indicate like parts throughout the several views.

Figure 1:
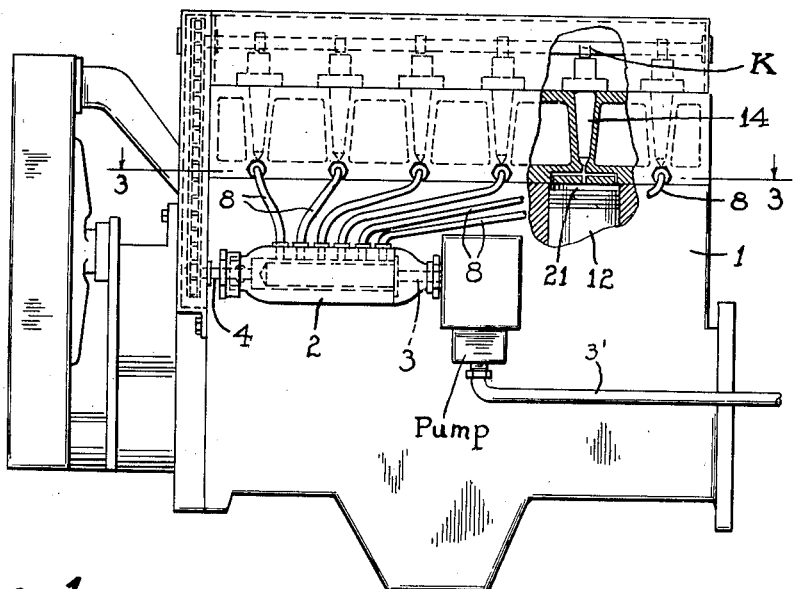
Figure 1 is a side elevation of my invention applied to a six-cylinder, internal combustion engine of the Diesel type with a portion of one of the cylinders shown in vertical section.
Figure 2:
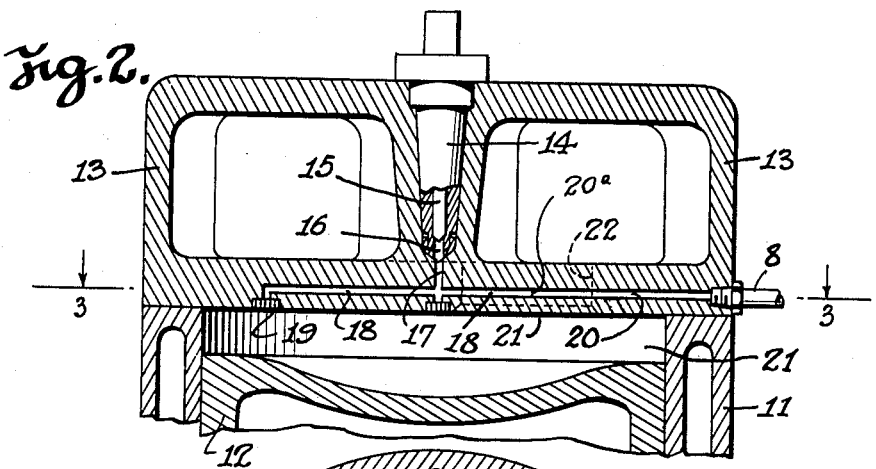
Fig. 2 is a vertical section through the cylinder head and a portion of the cylinder and piston of a Diesel engine on line 2—2 of Fig. 3 illustrating the combined pump and injection nozzle for diffusing the charge.
Figure 3:
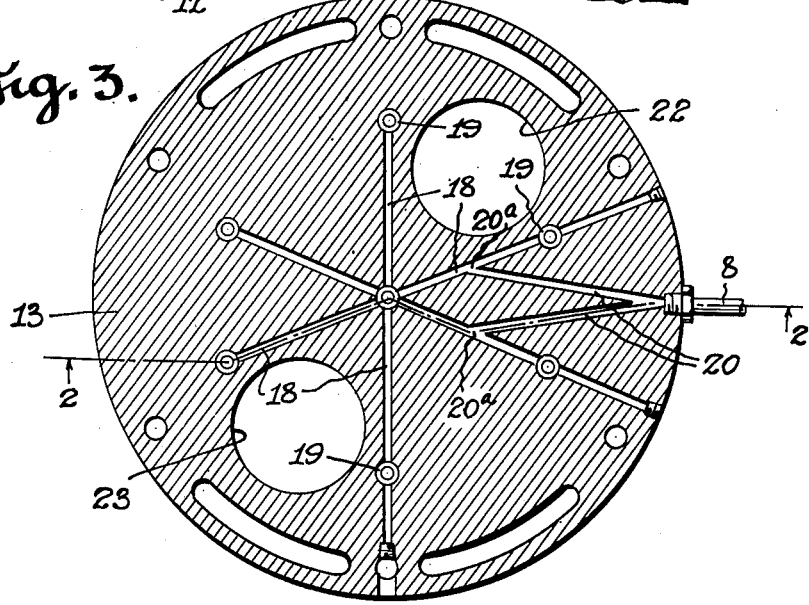
Fig. 3 is a horizontal section on line 3—3 of Fig. 2, showing just where and how the fuel is introduced to the air during the compression stroke.

Referring to Fig. 1 of the drawings, there is illustrated a conventional engine housing 1 for a six-cylinder engine. I provide a novel fuel distributing valve, as shown in Fig. 1, rotatably mounted in the valve casing 2 into which fuel is supplied through conduit 3. The fuel is supplied through conduits 8 to the cylinder head 13, as illustrated in Figs. 2 and 3. Distributing valve 5 is rotated by shaft 4, driven from some suitable source of power as by a gear and chain connection with a gear on the cam shaft C, as indicated in dotted lines in Fig. 1. As shown in Fig. 4 a suitable packing nut 9 is threaded on the end of valve casing 2.

Referring to Figs. 2 and 3 there is illustrated a cylinder 11, piston 12 and cylinder head 13 of my improved form of Diesel engine, showing the manner in which fuel is delivered to the combustion chamber. Mounted in the cylinder head 13 is a combined pump and injection nozzle 14 for diffusing the charge which has a plunger 15 actuated from the cam shaft K to compress air and fuel in the compression chamber 16. Fuel is supplied through conduit 8 to diverging channels 20 and thence to the radiating channels 18 and thence to orifices 19 into the top of the combustion chamber 21, as shown in Figs. 2 and 3. The orifices 19 may be fitted with plugs which are threaded and have openings of any suitable size and shape desired, preferably shaped to cause fuel to spread as much as possible such as plugs 31 shown in Fig. 11. Multiple passages 18 are preferred, but I may provide a single passage 18 from conduit 8, and a single orifice 19 for each of the several forms of my invention.

As shown in Fig. 3, the fuel which enters through conduit 8 passes through channel 20 into the passages 18 at an acute angle, preferably but not necessarily. The several channels 18 connect all the orifices 19 and also the small chamber 16, (shown in Fig. 2) under the usual spray plunger. Plunger 15 operates in the usual manner of such plungers, being forced inwardly by a cam and rocker mechanism so as to displace the contents of chamber 16 and then return outwardly by force of a spring at its head when the cam on the cam shaft releases. In operation the system of fuel supply is as follows: Assuming the engine is a four-cycle one, piston 12 moves outwardly on a suction stroke drawing in a charge of fresh air through intake 22, and on the piston's return stroke, this air begins to compress. Chamber 23 is the exhaust. As compression pressure increases, plunger 15 starts to move upward due to spring action and cam release (or has already moved outward) leaving chamber 16. The increase of compression pressure in combustion chamber 21 forces air through all the openings 19 so that the pressure in passages 18 and chamber 16 increases as piston moves toward cylinder head 13. Before this pressure is very appreciable and while air is rushing through passages 18 by the points 20a at a very high rate, the fuel is timed to enter through conduits 8, (as previously described), thence through passages 20 at points 20a. Because of the acute angle, very little pressure will be required in the fuel system.

By the time the piston has reached the inner end of its stroke and pressure in combustion chamber 21, channels 18 and chamber 16 are at their maximum, the plunger 15 starts to move inwardly due to cam action. This is so timed that contents of chamber 16 (fuel and air) are forced out through all the orifices 19, and combustion takes place in a steady, positive and complete manner. After this power stroke and the return exhaust stroke, the cycle repeats.

The usual practice in delivering the fuel charge into the cylinder is to have the injection or spray nozzle, as it is sometimes called, as close to the combustion chamber as possible, so that the inward stroke of plunger 15 will completely discharge all fuel from compression chamber 16 into combustion chamber 21. At first glance and from a theoretical standpoint this seems desirable. My design very evidently does not do this, and apparently is at a disadvantage in that injection of fuel leaves quite a supply left over in passages 18. This, however, is a great advantage and is a primary part of the invention. The chief advantage lies in the fact that sufficient fuel (though a very small part of each charge) remains in these passages 18 to mix with the air on compression stroke as this air rushes through these passages 18, through orifices 19. This mixture of fuel and air becomes effective when piston nears it inner end of stroke and pressures have risen to over 400 pounds per square inch, for the fuel therein will ignite at this high pressure (due to great rise in temperature of air) and in igniting will heat the new charge of fuel much more than would otherwise be the case. This new charge of fuel, having come into passages 18 at 20a from conduit 8 and passages 20 is in a much different physical state than is the case in the usual fuel delivery. This is due to the fact that as soon as the least particle of fuel reaches point 20a it is snatched away and completely vaporized by the powerful rush of compressed air past point 20a through passages 18. This method of shattering the fuel at point 20a and combining it with some hot fuel left over after each power stroke, and the delivery of each fuel charge through several orifices 19 gives a much improved preparation of the fuel charge. Another important advantage from the standpoint of cost and maintenance of the fuel system lies in the feature of making it possible to deliver the fuel supply at point 20a at very little above atmospheric pressure, although from resistance in pipe lines and fuel distributor valve, some pressure will be needed. Such a pressure, however, will be lower than usual pressures and is a great advantage in many ways, especially, for higher speed engines than have yet been produced.

Figs. 4 and 5 illustrate my invention having the separate plunger elements 40 and 41 replacing the conventional combined pump and fuel injection single plunger 15 shown in Fig. 2. The inner plunger 40 is slidably mounted in the outer and upper plunger 41 with a spring 42, seated in a recess in member 41 interposed between members 40 and 41 and spacing the upper end of member 40 from the upper end of chamber 43 of upper plunger member 41, to normally maintain the space or chamber 43 between these plunger elements. Inner plunger member 40 has opposite similar channels 45 extending from its upper end to a point about half way down that member and opening into chambers 47. Channels 48 are provided in the plunger casing 50, extending from a point adjacent the lower end 46 of upper outer plunger member 41 to the combustion chamber 21. A suitable key 49 carried by plunger 40 and traveling in a corresponding recess in plunger 41 prevents plunger 40 from separating from plunger 41. The recess may be made annular if desired.

As the piston comes to the end of its compression stroke and pressure in the combustion chamber has been built up to about 500 pounds, the same pressure is transmitted through channels 48 to annular chambers 47 and thence through channels 45 to chamber 43 and these spaces, like the combustion chambers, will be filled with compressed air to 500 pounds to the square inch. When injection of fuel starts, the cam operating the plunger 41 will force that plunger inwardly so that the lower end 46 of plunger 41 immediately covers the upper end of channels 48 where they open into the annular chamber 47. This operation traps all the air in chamber 47 and chamber 43 so that plunger 40 not only displaces all the fuel and air in chambers 16, as previously described, but the continuous motion of plungers 41 and 40 will operate to expel all the air in chambers 47 and 43 out through the channel 44 extending longitudinally through the center of plunger 40. In other words all the air in chamber 47 will be forced out through passages 45 into chamber 43, and thence down through channel 44 and out through passage 17 into channels 18 and thence through orifices 19 into the combustion chamber. This design especially for large engines would be advantageous in mixing the fuel and air and thoroughly completing combustion.

The reason that channels 48 are so important is due to the fact that chambers 47 and 43 are filled with air at 500 pounds pressure at the start, and this means that something happens immediately on the start of the inward movement of plunger 41. If, however, these spaces were filled with atmospheric air, little or no benefit would result. Return of plunger 41 outward then opens 48 so that the next compression stroke will complete the cycle described.

Figure 6:
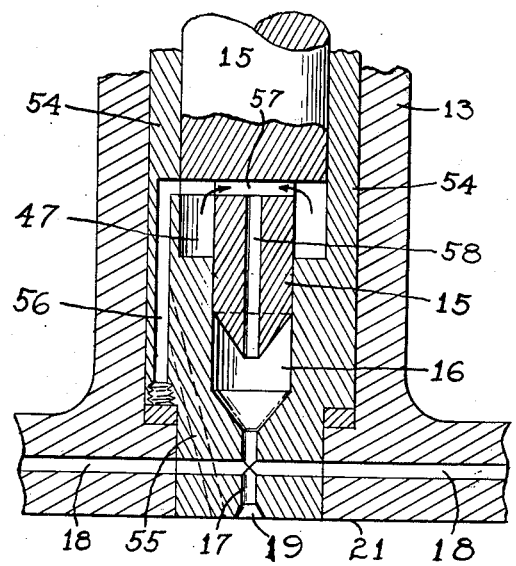
Fig. 6 is a vertical section of another form of combined pump and injection nozzle.

In Fig. 6 there is illustrated a simplified application of the form of invention illustrated in 14 and 15. In Fig. 6 there are provided one or more conduits 55 leading from combustion chamber 21 to annular chamber 47 around lower end of plunger 15 for the passage of air to chamber 47 from combustion chamber 21. A passage 57 extends transversely through plunger 15, whereby on downward movement of plunger 15, the air compressed in annular chamber 47 may flow through passage 57, as indicated by the arrows, into fuel chamber 16, which is in communication through passage 17 with the fuel channel 18 and with nozzle opening 19 into the internal combustion chamber. In this form of the invention the plunger 15 with its reduced and channeled lower end is an integral element and the spring 42 of Fig. 14 is eliminated. The extended lower end of plunger is of reduced size, as shown.

It will be observed that a characteristic and novel feature of my invention is that the fuel is delivered not at a hot point calculated to make carbon, but in a chamber or at a point which is well away from the hot center and well cooled by circulating water, yet the fuel is completely shattered and vaporized mechanically by forcing air into and mingling it with the fuel, and then heating the mixture in a suitable chamber by compression after it has been mechanically vaporized. In this way I avoid any possibility of carbon forming and have improved over the prior art.

What I claim is:

1. In an oil engine of the type described, the combination of a cylinder and piston movable therein, a cylinder head, fuel supply conduits in the cylinder head, a series of radiating conduits with which the fuel supply conduits communicate, nozzles opening out of said radiating conduits into the combustion chamber of the engine, an outer plunger, an inner plunger slidably mounted in the outer plunger, a spring interposed between said plungers, means for mechanically actuating said outer plunger at predetermined intervals relative to the operation of the pistons, a chamber adjacent said inner plunger, an air conduit opening out of the combustion chamber and extending to the aforesaid chamber adjacent the inner plunger, a fuel compression chamber on the under side of the inner plunger, an air passage through the inner plunger to the upper end thereof, and a separate air passage through the inner plunger extending from the upper end thereof to the air compression chamber at the lower end thereof.

2. In an oil engine of the type described, the combination of a cylinder and piston operable therein, a cylinder head, a plunger casing mounted in the cylinder head, an outer plunger reciprocably operable in said casing, a second plunger slidably mounted below said outer plunger, a compressible element normally spacing the upper end of the second plunger from the outer plunger, the space thus formed constituting an air compression chamber, a fuel compression chamber at the lower end of the second plunger, a channel communicating between the air compression chamber above and the fuel compression chamber below the second plunger, fuel passages radiating through the cylinder head, orifices from said passages into the combustion chamber, and a passage from the fuel compression chamber communicating with said fuel passages and with the combustion chamber, said fuel compression chamber being spaced substantially from the combustion chamber.

WHITNEY EASTMAN GREENE.